United States Patent

Fall

[15] 3,676,529
[45] July 11, 1972

[54] CURABLE GRAFT POLYMERS OF POLYALKYLENE OXIDES

[72] Inventor: Harry H. Fall, Akron, Ohio
[73] Assignee: The Goodyear Tire & Rubber Company, Akron, Ohio
[22] Filed: July 24, 1970
[21] Appl. No.: 58,184

Related U.S. Application Data

[63] Continuation-in-part of Ser. No. 649,469, June 28, 1967, abandoned.

[52] U.S. Cl. ..................260/887, 260/23.5 R, 260/23.7 M, 260/41 B, 260/41.5 R, 260/79.5 B, 260/874, 260/898
[51] Int. Cl. ..........................................................C08f 29/56
[58] Field of Search ....................260/887, 874, 898, 2 EP

[56] References Cited

UNITED STATES PATENTS

| | | | |
|---|---|---|---|
| 3,418,354 | 12/1968 | Wheeler | 260/448.2 |
| 3,398,074 | 8/1968 | Eguchi et al. | 204/159.15 |
| 3,222,423 | 12/1965 | Roebuck | 260/877 |

*Primary Examiner*—Samuel H. Blech
*Assistant Examiner*—C. Seccuro
*Attorney*—F. W. Brunner and R. H. Haas

[57] ABSTRACT

Substituted olefin monomers, such as diene and vinyl monomers, may be grafted to solid poly-1,2-alkylene oxide by employing a tertiary-butyl-perester catalyst at between 40° C. and 100° C. Diene and vinyl monomers may be grafter individually or as mixtures depending on the graft polymer properties desired. The inclusion of dienes yields a sulfur-curable gum stock whose vulcanizates have excellent physical properties for use as a general purpose rubber.

9 Claims, No Drawings

3,676,529

CURABLE GRAFT POLYMERS OF POLYALKYLENE OXIDES

This application is a continuation-in-part of application Ser. No. 649,469 filed June 28, 1967 now abandoned.

BACKGROUND

This invention relates to a novel polymerization process for graft polymerizing dienes as well as vinyl monomers to solid polymers or copolymers of 1,2-alkylene oxides containing from 3 to 12 carbon atoms, and to the novel products resulting therefrom.

Homopolymers and copolymers of 1,2-alkylene oxides are saturated polymers which will not cure when incorporated into the usual sulfur vulcanization recipes used for unsaturated rubbers since necessary crosslinking sites are not present. In present technology a sulfur curable poly-1,2alkylene oxide gum stock such as polypropylene oxide may be secured by the copolymerization of of polypropylene oxide with an unsaturated monomer, e.g., allyl glycidyl ether or butadiene. Grafting of vinyl monomers to liquid polyether glycols and triols is also known.

The successful grafting of a diene, e.g., isoprene, piperylene, or butadiene onto a polyalkylene oxide backbone would provide the sites required for crosslinking during sulfur vulcanization. If the diene merely homopolymerized in the presence of the polyalkylene oxide, curing of the polyalkylene oxide would not be possible. Evidence of grafting is thus established by the ability to sulfur-cure the product obtained. The extent of grafting is reflected in the physical properties of the cured material.

SUMMARY

Applicant has discovered that substituted olefins may be graft polymerized to solid poly-1,2-alkylene oxides by employing 0.5 to 20 parts by weight (pbw) of a tertiary-butyl-perester catalyst in the temperature range of between 40° C. and 100° C., to achieve graft polymers with between 3 and 50 pbw of diene graft based on the weight of backbone polymer. Vinyl monomers may also be grafted to solid poly-1,2-alkylene oxides employing the subject catalyst system. Where desired, the diene and vinyl monomers may be grafted simultaneously. The method may also be employed for graft polymerizing lower molecular weight poly-1,2-alkylene oxides which are liquids but the resulting product is also a liquid and not useful for the purposes of the invention.

DETAILED DESCRIPTION

The polymer employed in the practice of this invention is a homopolymer or copolymer of a lower 1,2-alkylene oxide, particularly those containing from three to 12 carbon atoms. The invention has been especially useful in grafting to polypropylene oxide. The homopolymers or copolymers employed are solid rubbery materials. Under the conditions of the method of the invention, the predominant reaction is the grafting of substituted olefins onto the poly-1,2-alkylene oxide homopolymer or copolymer. The secondary reaction is chain scission of the poly-1,2-alkylene oxide. Accordingly, the starting poly-1,2-alkylene oxide. Accordingly, the starting poly-1,2-alkylene oxide should preferably be in the molecular weight range of from about 750,000 to about 4,000,000. This corresponds to a D.S.V. (30° C. in benzene) of from about 4 to about 13 and a Mooney viscosity (ML-4/212) of from about 20 to about 200. The resulting grafter polyalkylene oxide will be a rubbery solid material having a D.S.V. of from about 3 to about 9 and a Mooney viscosity (ML–4/212) of from about 20 to about 100. These latter physical limitations (i.e., a Mooney viscosity between 20 and 100) are necessitated by the practical processing limitations of equipment presently readily available in the rubber industry and are limitations well known in this art. Lower molecular weight poly-1,2-alkylene oxides may also be grafted by the method of the invention, but if they are below about 750,000 they are normally not solid elastomers and not within the scope of the claimed invention.

The grafting monomers employed are substituted olefin compounds containing up to 12 carbon atoms. To obtain a sulfur-curable stock, at least a part of the grafting monomer employed must include a diene such as isoprene, piperylene, or butadiene. Among these, butadiene is preferred. Copolymeric grafts of vinyl monomers such as acrylonitrile, styrene, vinyl isobutyl ether, vinyl acetate and the like, with a diene provide sulfur-curable polypropylene oxide gum stocks with properties modified by the content and the characteristics of the polymerized vinyl monomer. Combinations of vinyl monomers with or without the diene are also possible. Applicant has found that an especially useful graft monomer charge which results in a fast reaction rate and a final product with excellent physicals is one containing a major portion (preferably about two-thirds pbw) butadiene or isoprene and a minor portion (preferably about one-third pbw) acrylonitrile. The amount of graft monomer charged may range from between 3 to 200 parts by weight of the polymer backbone material. It is preferred to charge between 10 and 100 pbw based on the polymer backbone material.

A free radical catalyst of the perester type is used to initiate the graft polymerization. Particularly useful in the practice of this invention are peresters such as tertiary-butyl peroctoate and tertiary-butyl peroxypivalate. Other useful peresters are tertiary-butyl peracetate, tertiary-butyl peroxyisobutyrate, tertiary-butyl peroxymaleic acid, di-tertiary-butyl diperphthalate, tertiary-butyl perbenzoate. All of these peresters have a half-life under 4 days in a temperature range between 40° C. and 100° C. in benzene. All are commercially available.

The catalyst may be employed in amounts as small as 0.5 pbw based on 100 parts of the polymer backbone material and may also be used in amounts as high as 20 pbw or even higher. Applicant prefers to employ between 2 and 8 pbw.

A solution polymerization technique is preferably employed in practicing the invention. The polymerization is conducted in a temperature range between 40° C. and 100° C. and preferably between 60° C. and 80° C. At temperatures above 100° C. the degradation reaction occasioned by chain scission predominates over the grafting reaction in the polymerization process and the resulting graft polymer will generally exist as a semi-solid or liquid and is therefore not useful as an elastomeric material. Below 40° C. the reaction rate is too slow to be commercially useful. Any solvent may be employed which is a solvent for the polymer backbone and the graft monomer, and will not adversely affect the catalyst. The aromatic hydrocarbons e.g., benzene, toluene and xylene, are especially suitable for this purpose.

EXAMPLE 1

Polypropylene oxide was prepared using a diethylzinc-water catalyst system. The polymer was recovered by steam stripping. No antioxidant was added at this stage as a precaution against interference with the subsequent grafting reaction. Polymer with a dilute solution viscosity (DSV) of 8.0 dl/g or higher was used. This DSV is equivalent to approximately 2,000,000 molecular weight.

A cement of propylene oxide in benzene was prepared by stirring overnight and heating to reaction temperature. A monomer mixture of acrylonitrile and diene was then added. This was uniformly dispersed through the cement by continued stirring. The full amount of the catalyst in benzene solution was added. Approximately 1 percent of phenyl-$\beta$-naphthylamine based on the weight of the graft product was added as an antioxidant before workup of the product.

Several runs were made in which the quantities of the various ingredients were kept in a constant proportion to each other and with the cement as first prepared being approximately 5 percent in polypropylene oxide. On the basis of 100 pbw of polypropylene oxide, the charge was composed of 100 pbw of isoprene and 5 pbw of acrylonitrile. The weight of the catalyst taken was calculated on the basis of one crosslink to be formed for every 10,000 molecular weight of the backbone polymer and of a 50 percent catalyst efficiency in the case of the tertiary-butyl peroctoate. The catalyst weight in one experiment (No. 2) was halved. Table I shows the data on four runs employing tertiary-butyl peroctoate catalyst and an isoprene-acrylonitrile monomer mix.

TABLE I

Graft Polymerization of Isoprene onto Polypropylene Oxide

| Charge | RUN NO. | | | |
|---|---|---|---|---|
| | 1 | 2 | 3 | 4 |
| Polypropylene Oxide, g. | 440 | 400 | 400 | 400 |
| Benzene, l. | 14.0 | 10.0 | 10.0 | 10.0 |
| Isoprene, g. | 440 | 400 | 400 | 400 |
| Acrylonitrile, g. | 22 | 20 | 20 | 20 |
| Tertiary-butyl Peroctoate, g. | 18.7 | 8.5 | 17.0 | 17.0 |
| Temperature °C. | 60 | 60 | 70 | 60 |
| Reaction Time, hrs. | 168 | 263 | 48 | — |
| Product, g.[1] | 532 | 472 | 497 | — |
| Dilute Solution Viscosity | | | | |
| Original | 8.6 | 17.0 | 11.8 | 8.85 |
| Final | 6.44 | 4.93 | 5.53 | — |

[1] Weight includes about 1% phenyl-$\beta$-naphthylamine added as antioxidant

The polymer recovered from Run 1 in the manner described above was compounded into the following curing recipe:

| | pbw |
|---|---|
| Gumstock | 100.0 |
| Zinc Oxide | 5.0 |
| Stearic Acid | 3.0 |
| Phenyl-$\beta$-naphthylamine | 0.5 |
| Tetramethylthiuram Disulfide | 1.0 |
| Mercaptobenzothiazole | 1.0 |
| Sulfur | 2.0 |

The use of phenyl-$\beta$-naphthylamine in this recipe is optional and contributes added protection as antioxidant to cured stock.

Molded tensile strips, 1×2×0.05-inch, were made for a sequence of cure times at 305° F. From each strip two 0.1 dumbbells were died out. These were then used for such standard stress-strain measurements as 300 percent modulus, tensile at break and elongation at break as well as for such standard swell measurements as insolubles content and swell volume index.

The results of these measurements are compiled in Table II. These demonstrate that grafting isoprene onto a solid polypropylene oxide polymer produces a very satisfactory general purpose rubber. Tensile at break as high as 1,410 psi and elongation at break as high as 715 percent were obtained with this cure recipe; the insolubles content was 85 percent and the swell volume index 10.1.

TABLE II

Properties of Vulcanizates—Run 1

| Min. 305°F. | 300% psi | Tensile psi | Percent Elongation | Percent Insolubles | Swell Vol. Index |
|---|---|---|---|---|---|
| 15 | 230 | 1315 | 715 | 85.0 | 10.1 |
| 30 | 255 | 945 | 575 | 84.9 | 10.6 |
| 60 | 315 | 1410 | 600 | 84.5 | 10.4 |
| 90 | 295 | 815 | 505 | 84.0 | 10.9 |
| 120 | 320 | 1070 | 550 | 84.5 | 10.7 |

In run 2 (Table I) the catalyst concentration was halved and in run 3 the reaction temperature was raised to 70° C., all other conditions being kept constant.

At one-half catalyst concentration it was necessary to lengthen the reaction time from about 168 hours to 263 hours in order to bring the level of grafting to that achieved with the full amount of catalyst. The recovered product was compounded into the curing recipe previously described and subjected to a sequence of cures at 275° F. Stress-strain and swell measurements were obtained from these vulcanizates as described above. The data are compiled in Table III. Increasing the reaction temperature to 70° C. from 60° C. (demonstrated by runs 3 and 1 respectively in Table I) reduced from 168 hours to 48 hours the time required to achieve the same degree of grafting.

TABLE III

Catalyst Concentration/Temperature Effects

Run 2

| Cure temp. | Cure min. | 300% psi | Tensile psi | Percent Elongation | Percent Insolubles | Swell Vol. Index |
|---|---|---|---|---|---|---|
| 275°F. | 10 | 420 | 1635 | 585 | 89.3 | 11.5 |
| | 20 | 525 | 1700 | 555 | 89.4 | 11.7 |
| | 30 | 530 | 1615 | 535 | 89.2 | 11.8 |
| | 60 | 500 | 1745 | 550 | 89.5 | 12.1 |

Run 3

| | | | | | | |
|---|---|---|---|---|---|---|
| 275°F. | 10 | 510 | 2375 | 620 | 90.2 | 8.97 |
| | 20 | 515 | 2115 | 565 | 90.5 | 8.86 |
| | 30 | 570 | 1990 | 525 | 90.9 | 8.69 |
| | 60 | 555 | 2040 | 520 | 90.8 | 8.82 |

The graftings performed in the runs disclosed hereinabove were terminated after the completion of a minimum of two half-lives of the catalyst. The products recovered were composed of about 80 percent polypropylene oxide and 20 percent isoprene grafter thereto. Table IV shows the data on four fractions of run 4 Table I, which fractions were removed from the polymerizing mixture at different levels of grafting as determined by solids content and which in total constituted the complete run. Table IV lists the pertinent information concerning these fractions. Each of these fractions was taken one-half hour after the time a small sample had been removed for solids determination in order to allow time for the determination before removal of the fraction. These portions were compounded and used for a limited study of physical properties. The latter results are compiled in Table V. All samples were compounded according to the curing recipe described above and subjected to curing at 275° F. From the table it can be seen that the grafts containing higher isoprene levels exhibit better physical properties in this particular cure recipe.

TABLE IV

Grafting as Function of Time

| Time | Graft Percent |
|---|---|
| Hrs. | |
| 6.5 | 11.05 |
| 23.5 | 13.10 |
| 47.5 | 18.65 |
| 78.0 | 21.05 |

TABLE V

Vulcanizate Properties as a Function of Degree of Grafting

| Graft % | Min. Cure (275°F) | 300% psi | Tensile psi | % elong-ation | % insolu-bles | Swell Vol. Index |
|---|---|---|---|---|---|---|
| 11.05 | 10 | 190 | 215 | 375 | (1) | (1) |
|  | 20 | 365 | 685 | 450 | 61.8 | 45.6 |
|  | 30 | 415 | 545 | 385 | 59.5 | 46.7 |
|  | 60 | 400 | 615 | 400 | 60.5 | 46.3 |
| 13.10 | 10 | 295 | 650 | 480 | 68.4 | 29.6 |
|  | 20 | 465 | 1355 | 510 | 83.3 | 17.1 |
|  | 30 | 485 | 1530 | 525 | 84.1 | 16.8 |
|  | 60 | 465 | 1320 | 515 | 82.0 | 17.6 |
| 18.65 | 10 | 360 | 1610 | 595 | 87.9 | 11.6 |
|  | 20 | 425 | 1860 | 590 | 89.9 | 11.3 |
|  | 30 | 435 | 1960 | 590 | 89.7 | 11.2 |
|  | 60 | 470 | 1720 | 585 | 91.3 | 11.4 |
| 21.05 | 10 | 360 | 1565 | 615 | 87.7 | 12.3 |
|  | 20 | 420 | 1875 | 595 | 90.4 | 11.1 |
|  | 30 | 410 | 1790 | 600 | 90.3 | 11.1 |
|  | 60 | 415 | 1875 | 580 | 89.6 | 11.1 |

(1)Strip dissolved in solvent

From 100 parts by weight of the grafted gumstock obtained from Run 1, Table I, a stock containing 30 parts by weight of HAF 299 Black was prepared. The curing ingredients were then milled in and the usual procedure for obtaining physical measurements carried out. Curing was performed at 305° F. The data are compiled in Table VI.

TABLE VI

Vulcanizate Properties of Black Loaded Stock

| Min. Cure | 300% psi | Tensile psi | % Elong-ation | % Insol-ubles | Swell Vol. Index |
|---|---|---|---|---|---|
| 5 | 580 | 1485 | 650 | 88.7 | 6.15 |
| 10 | 580 | 1235 | 570 | 87.7 | 5.96 |
| 15 | 855 | 1610 | 560 | 81.9 | 7.39 |
| 30 | 900 | 1535 | 510 | 81.4 | 7.69 |
| 60 | 1020 | 1480 | 450 | 81.1 | 7.69 |

From this same black stock containing the curing ingredients, a special strip, 1×2×0.075 inches, was made at 10 min/305° F. for Gehman twist. Results were:

| $T_2$ | −9°C. |
| $T_5$ | −28°C. |
| $T_{10}$ | −39.5°C. |
| $T_{100}$ | −65°C. |

From a curve plotted for this function (not given) the Tg for this material was judged to be −65°C.

The solvent resistance of this black stock was examined. Molded tensile strips were made for this purpose by curing at 305° F. for 15 min. The results are tabulated in Table VII.

TABLE VII

| Temp. | Time | % Gain ASTM oil no. 1 | ASTM oil no. 3 |
|---|---|---|---|
| 77°F. | 24 hours | 2.41 | 27.02 |
|  | 7 days | 4.49 | 203.03 |
| 212°F. | 24 hours | 11.94 | 50.81 |
|  | 7 days | 11.06 | Disintegrates |

EXAMPLE 2

The same general procedures set forth in Example 1 were employed to prepare and graft polypropylene oxide at 70° C. in benzene with acrylonitrile (Table VIII) and without acrylonitrile (Table IX) mixed with the isoprene monomer under identical experimental conditions.

TABLE VIII

Charge: 100 pbw Polypropylene Oxide
100 pbw Isoprene
5 pbw Acrylonitrile
4.25 pbw Tertiary-Butyl Peroctoate Samples Removed For Solids Determination

| Reaction Time Hours | Percent (1) Graft |
|---|---|
| 0 | — |
| 1 | 2.5 |
| 4 | 6.0 |
| 6 | 8.0 |
| 7 | 10.6 |
| 10 | 12.1 |
| 14 | 14.4 |
| 24 | 18.2 |

(1)Determined by increases in solids content (Wg)/(Wo + Wg)

TABLE IX

Charge: 100 pbw Polypropylene Oxide
100 pbw Isoprene
4.25 pbw Tertiary-butyl Peroctoate Samples Removed For Solids Determination

| Reaction Time Hours | Percent Graft(1) |
|---|---|
| 0 | — |
| 1 | 3.3 |
| 2 | 2.3 |
| 4 | 1.9 |
| 6 | 3.5 |
| 8 | 3.3 |
| 10 | 4.1 |
| 14 | 6.1 |
| 18 | 6.7 |
| 22 | 8.0 |
| 26 | 8.8 |
| 30 | 11.5 |
| 34 | 10.7 |

(1)Determined by increases in solids content (Wg)/(Wo + Wg)

The data in Tables VIII and IX show that the use of acrylonitrile in the grafting procedure enhanced the rate of grafting.

EXAMPLE 3(A)

Employing the general procedure described in Example 1 above, a reaction charge of 300g. of polypropylene oxide, 60g. of butadiene, 30g. of acrylonitrile, and 12.75g. of tertiary-butyl peroctoate in 14 liters of benzene was stirred for 48 hours at 70° C. The recovered product was incorporated into the previously described curing recipe. A tensile strip cured at 275° F. for 30 minutes had a 300 percent modulus of 690 psi, a tensile at break of 3,395 psi and an elongation at break at 670 percent.

EXAMPLE 3(B)

The same procedure as described in Example 3(A) was employed except that isoprene was substituted for butadiene therein. The tensile strip properties were: 300 percent modulus of 780 psi, tensile at break of 2,800 psi and an elongation at break 600 percent.

EXAMPLE 4

Employing the general procedure described in Example 1, a reaction charge of 300g. of polypropylene oxide, 45g. of isoprene, 45g. of acrylonitrile, and 12.75g. of tertiary-butyl peroctoate in 13 liters of benzene was stirred for 48 hours at 70° C. The recovered product was incorporated into the previously described curing recipe. A tensile strip cured at 275° F. for 30 minutes had a 300 percent modulus of 525 psi, a tensile at break of 2,600 psi and an elongation at break of 680 percent.

While certain representative embodiments and details have been shown for the purpose of illustrating the invention, it will be apparent to those skilled in this art that various changes and modifications may be made therein without departing from the spirit or scope of the invention.

I claim:

1. The process which comprises solution, free radical, graft polymerizing onto a solid poly-1,2-alkylene oxide containing from three to 12 carbon atoms at a temperature between 40° C. and 100° C. in the presence of a tertiary butyl perester catalyst, a member of the group consisting of butadiene, isoprene, piperylene, acrylonitrile, styrene, vinyl isobutyl ether, vinyl acetate, or mixtures thereof.

2. The process according to claim 1 wherein the grafting monomer is butadiene or isoprene or a mixture thereof.

3. The process according to claim 1 wherein the grafting monomer is butadiene or isoprene or a mixture thereof and acrylonitrile.

4. The process according to claim 1 wherein the tertiary butyl perester catalyst is employed in amounts between 0.5 and 20.0 parts by weight of the polyalkylene oxide, the polymerization is conducted in an aromatic hydrocarbon solvent at a temperature between 40° C. and 80° C., and the grafting monomer-charge is between 3 and 200 parts by weight of the polyalkylene oxide.

5. The process according to claim 4 wherein the grafting monomer is butadiene or isoprene or mixtures thereof and acrylonitrile.

6. A graft polymer comprising a backbone of poly-1,2-alkylene oxide containing from three to 12 carbon atoms and a grafted side chain which is a member of the group consisting of butadiene, isoprene, piperylene, styrene, vinyl isobutyl ether, vinyl acetate, or mixtures thereof, wherein the grafted side chain is present in amounts between 3 and 50 parts by weight of the polymer backbone and the graft polymer has a Mooney Viscosity (ML–4/212) of from about 20 to about 100.

7. The graft polymer according to claim 6 wherein the grafted side chain is polybutadiene or polyisoprene.

8. A graft polymer comprising a backbone of poly-1,2-alkylene oxide containing from three to 12 carbon atoms and a grafted side chain which consists of a major portion in parts by weight of polybutadiene or polyisoprene and a minor portion in parts by weight of polyacrylonitrile, wherein the grafted side chain is present in amounts between 3 and 50 parts by weight of the polymer backbone and the graft polymer has a Mooney Viscosity (ML–4/212) of from about 20 to about 100.

9. The graft polymer according to claim 8 wherein the 1,2-alkylene oxide is polypropylene oxide.

* * * * *